(12) United States Patent
Fukushima (10) Patent No.: US 10,104,294 B2
(45) Date of Patent: Oct. 16, 2018

(54) PHOTOMETRIC APPARATUS AND METHOD FOR CONTROLLING SAME

(71) Applicant: CANON KABUSHIKI KAISHA, Tokyo (JP)

(72) Inventor: Yuki Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 14/812,849

(22) Filed: Jul. 29, 2015

(65) Prior Publication Data
US 2016/0037076 A1    Feb. 4, 2016

(30) Foreign Application Priority Data

Jul. 31, 2014 (JP) .................... 2014-156792

(51) Int. Cl.
*H04N 5/222* (2006.01)
*H04N 9/73* (2006.01)
*H04N 5/232* (2006.01)
*H04N 5/235* (2006.01)

(52) U.S. Cl.
CPC ....... *H04N 5/23293* (2013.01); *H04N 5/2351* (2013.01)

(58) Field of Classification Search
CPC .......... G03B 17/06; G03B 13/00; G01J 1/00; H04N 5/2228; H04N 5/23293; H04N 9/3182; H04N 9/73; H04N 1/6077; H04N 5/2351
See application file for complete search history.

(56) References Cited

U.S. PATENT DOCUMENTS

| | | | |
|---|---|---|---|
| 2006/0072028 A1* | 4/2006 | Hong | H04N 5/23216 348/333.01 |
| 2009/0040332 A1* | 2/2009 | Yoshino | H04N 5/2354 348/222.1 |
| 2012/0062693 A1* | 3/2012 | Hada | G02B 7/102 348/36 |
| 2012/0314117 A1* | 12/2012 | Irie | H04N 5/23212 348/333.02 |

FOREIGN PATENT DOCUMENTS

| | | |
|---|---|---|
| CN | 101030016 A | 9/2007 |
| CN | 101364031 A | 2/2009 |
| CN | 101859050 A | 10/2010 |
| JP | H04-308825 A | 10/1992 |
| JP | H08-160520 A | 6/1996 |

* cited by examiner

*Primary Examiner* — Sinh Tran
*Assistant Examiner* — Selam Gebriel
(74) *Attorney, Agent, or Firm* — Canon USA Inc., IP Division

(57) ABSTRACT

A photometric apparatus includes a photometry unit (AE sensor) configured to measure object light, and a first display unit (intra-viewfinder liquid crystal display unit) arranged on an optical path of the object light to the photometry unit and configured to display a plurality of display items. The first display unit is configured to display a first display item (automatic white balance) among the plurality of display items in a position farther from a center of a photometry range by the photometry unit than a position of a second display item (incandescent lamp display) having a display area smaller than a display area of the first display item.

22 Claims, 8 Drawing Sheets

| n | WB MODE | CORRESPONDING ICON |
|---|---|---|
| 1 | AUTOMATIC WHITE BALANCE | AWB |
| 2 | SUNLIGHT | |
| 3 | SHADE | |
| 4 | CLOUDY | |
| 5 | INCANDESCENT LAMP | |
| 6 | WHITE FLUORESCENT LAMP | |
| 7 | FLASH | |
| 8 | MANUAL | |
| 9 | COLOR TEMPERATURE | K |

PHOTOMETRIC APPARATUS AND METHOD FOR CONTROLLING SAME

BACKGROUND OF THE INVENTION

Field of the Invention

The present invention relates to a photometric apparatus that includes a display unit including a photometric range, and a method for controlling the photometric apparatus.

Description of the Related Art

It is desirable to check a setting state of an imaging apparatus, such as a single-lens reflex (SLR) camera, while a user is looking through a viewfinder of the imaging apparatus. To enable such checking of the setting state, an electronic viewfinder may be used to display an object together with the setting state in the viewfinder. Alternatively, a display element, such as a liquid crystal display, may be arranged with an optical viewfinder to overlap a focusing screen. The display (screen) of the display element is then used to display the setting state and the focus screen in a superimposed manner. However, since the light from the focusing screen is guided to a pentagonal prism and a photometric sensor, the display by the display element on the focusing screen may affect a photometry result.

In view of the effect on the photometry result, Japanese Patent Application Laid-Open No. 8-160520 discusses a method for performing a correction based on two pieces of information on a type of an exchangeable focusing screen and a position of an area display by a display element. If the display by the display element arranged in a position overlapping the focusing screen affects the photometry result as described above, image capturing parameters, such as exposure and International Organization of Standardization (ISO) sensitivity may be affected.

According to Japanese Patent Application Laid-Open No. 8-160520, a correction is performed based on the type of the exchangeable focusing screen and the position of the display of the display element on the focusing screen. The effect on the photometry result therefore cannot be reduced unless an amount of correction is changed each time the focusing screen is replaced or the display position of the display element is changed.

SUMMARY OF THE INVENTION

In view of the foregoing issue, the present invention is directed to a photometric apparatus that reduces an effect on a photometry result caused by the display overlapping the focusing screen.

According to an aspect of the present invention, a photometric apparatus includes a photometry unit configured to measure object light, and a first display unit arranged on an optical path of the object light to the photometry unit and configured to display a plurality of display items, wherein the first display unit is configured to display a first display item outside a region of a display screen of the first display unit corresponding to a photometric range where the photometry unit measures light, and display a second display item having a display area smaller than a display area of the first display item inside the region of the display screen corresponding to the photometric range.

Further features of the present invention will become apparent from the following description of exemplary embodiments with reference to the attached drawings.

DESCRIPTION OF THE EMBODIMENTS

An exemplary embodiment of the present invention will be described in detail below with reference to the accompanying drawings. It is noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1:
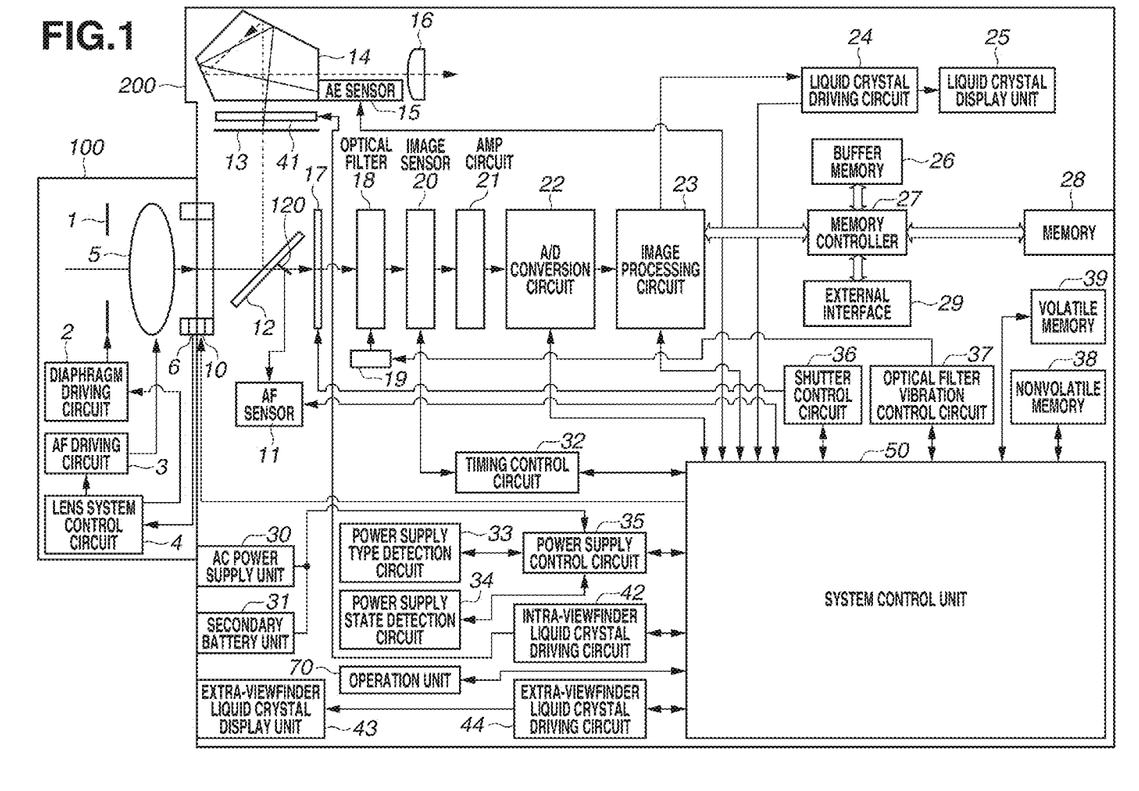
FIG. 1 is a block diagram illustrating an example of a configuration of an imaging apparatus.
Figure 2A:
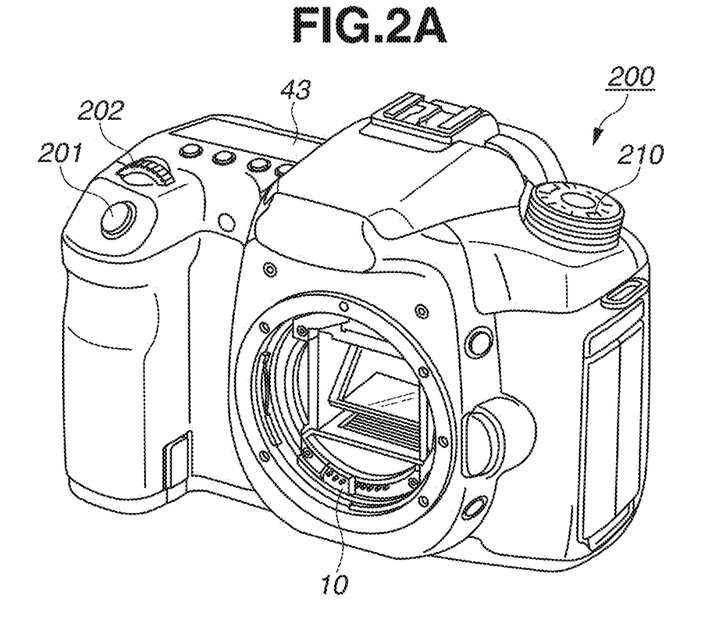
FIGS. 2A and 2B are external perspective views of the imaging apparatus.
Figure 2B:
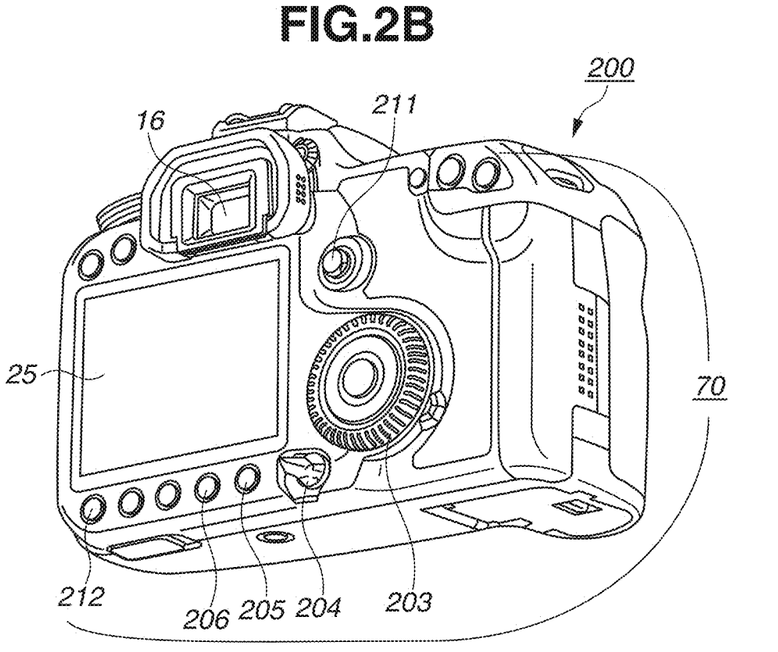

FIG. 1 is a block diagram illustrating an example of a configuration of an imaging apparatus 200 with a built-in photometric apparatus according to an exemplary embodiment of the present invention. FIGS. 2A and 2B are diagrams each illustrating an external perspective view of the imaging apparatus 200 serving as an example of the imaging apparatus according to the present exemplary embodiment. FIG. 2A is a front perspective view of the imaging apparatus 200. FIG. 2B is a rear perspective view of the imaging apparatus 200.

A lens unit 100 is an exchangeable lens unit including an image lens. A lens (imaging lens) 5 usually includes a plurality of lenses, which is represented by a single lens in FIG. 1 for the sake of simplicity. A communication terminal 6 is a communication terminal for the lens side to communicate with the imaging apparatus side. A communication terminal 10 is a communication terminal for the imaging apparatus 200 to communicate with the lens side. The lens unit 100 communicates with a system control unit 50 via the communication terminals 6 and 10, controls a diaphragm 1 via a diaphragm driving unit 2 by using a lens system control circuit 4 inside thereof, and changes a position of the lens 5 for focusing via an automatic focusing (AF) driving circuit 3. The system control unit 50 obtains a full aperture value and a minimum aperture value of the lens unit 100 via the communication terminals 6 and 10.

An automatic exposure (AE) sensor 15 measures luminance of an object (object light) formed on a focusing screen 13 through the lens unit 100 and a quick-return mirror 12.

An AF sensor 11 is a phase difference detection AF sensor. The AF sensor 11 captures an image incident via the quick-return mirror 12 and a sub mirror 120, and outputs defocus amount information to the system control unit 50. The system control unit 50 controls the lens unit 100 based on the defocus amount information.

The quick-return mirror 12 is moved up and down by a not-illustrated actuator according to instructions from the system control unit 50 during exposure.

The photographer (user) observes an image formed on the focusing screen 13 through a viewfinder optical system including a pentagonal prism 14 and (an eyepiece unit of) a viewfinder 16. The photographer can thus visually observe a focus state and composition of an optical image of the object obtained through the lens unit 100.

A focal plane shutter 17 is intended to control exposure time of an image sensor 20 according to control of the system control unit 50.

An optical filter 18 typically includes a low-pass filter. The optical filter 18 cuts off high-frequency components of the light that enters through the lens unit 100 when the focal plane shutter 17 is open, and guides the light of an object image to the image sensor 20.

The image sensor 20 is typically a charge-coupled device (CCD) or a complementary metal-oxide-silicon (CMOS) image sensor. The image sensor 20 photoelectrically converts the object image formed on the image sensor 20 through the lens unit 100, and outputs the resultant as an electrical signal.

An amplifier (AMP) circuit 21 amplifies an image capturing signal by a gain to the electrical signal output from the image sensor 20, according to a set image capturing sensitivity.

An analog-to-digital (A/D) conversion circuit 22 converts the electrical signal converted by the image sensor 20, i.e., an analog signal into a digital signal.

An image processing circuit 23 performs filter processing, color conversion processing, gamma/knee processing, and the like on image data that is the digital signal converted by the A/D conversion circuit 22, and outputs the resulting image data to a memory controller 27. The image processing circuit 23 includes a digital-to-analog (D/A) conversion circuit. The image processing circuit 23 can convert the image data that is the digital signal converted by the A/D conversion circuit 22 or image data input from the memory controller 27 into an analog signal, and output the analog signal to a liquid crystal display unit 25 via a liquid crystal driving circuit 24. The image processing and the display processing of the image processing circuit 23 are switched by the system control unit 50. The system control unit 50 performs a white balance adjustment based on color balance information about a captured image.

The liquid crystal display unit 25 is a rear monitor for displaying an image. As illustrated in FIG. 2B, the liquid crystal display unit 25 is arranged on the rear side of the imaging apparatus 200. The display for displaying an image is not limited to a liquid crystal display. Displays of other types, such as an organic electroluminescence (EL) display, may be used.

The memory controller 27 stores raw image data input from the image processing circuit 23 into a buffer memory 26. The memory controller 27 stores image-processed image data input from the image processing circuit 23, such as Joint Photographic Experts Group (JPEG) image data, into a memory 28. The memory controller 27 may, reversely, obtain image data from the buffer memory 26 or the memory and output the image data to the image processing circuit 23. The memory controller 27 can store image data transmitted via an external interface 29 into the memory 28, and, reversely, output image data stored in the memory 28 to outside via the external interface 29. Examples of the external interface 29 include a wireless interface, a Universal Serial Bus (USB), an Institute of Electrical and Electronics Engineers (IEEE) interface, and a High-Definition Multimedia Interface (HDMI) (registered trademark). The memory 28 may be a detachable recording medium, such as a memory card. The memory 28 may be a built-in memory.

The system control unit 50 controls driving timing of the image sensor 20 via a timing control circuit 32.

A power supply control circuit 35 is a circuit that controls power supplied from an alternating-current (AC) power supply unit 30 or a secondary battery unit 31. The power supply control circuit 35 turns the power supply on and off under instructions from the system control unit 50. The power supply control circuit 35 notifies the system control unit 50 of information about a current power supply state detected by a power supply state detection circuit 34 and information about the type of the current power supply detected by a power supply type detection circuit 33.

The system control unit 50 controls the focal plane shutter 17 via a shutter control circuit 36.

An optical filter vibration control circuit 37 is a circuit for vibrating a piezoelectric element 19 connected with the optical filter 18 to shake dust off the optical filter 18. The optical filter vibration control circuit 37 causes the piezoelectric element 19 to vibrate with an amplitude, time, and an axial direction of predetermined values according to instructions from the system control unit 50.

A nonvolatile memory 38 is a nonvolatile recording medium. The nonvolatile memory 38 can retain setting values, such as a shutter speed, an aperture value, and image capturing sensitivity, arbitrarily set by the user, various types of other data, and various control programs, even in a state where the imaging apparatus 200 is not powered on.

A volatile memory 39 retains data to be temporarily stored. Examples of the data include an internal state of the imaging apparatus 200 and information about the memory 28 which is detachable.

An intra-viewfinder liquid crystal display unit 41 (first display unit) is arranged on a viewfinder optical path. The intra-viewfinder liquid crystal display unit 41 displays a range finding frame indicating a range finding region where an automatic focusing operation is currently performed, and icons (display items) indicating a setting state of the camera (imaging apparatus 200). The focusing screen 13 and the intra-viewfinder liquid crystal display unit 41 are located close to each other (arranged in a close vicinity), and arranged to overlap so that these displays can be simultaneously observed.

A path (optical path) of light to be measured will be described. The light to be measured by the AE sensor 15 (light from the object side and an incident part) passes through the lens 5, and the traveling direction of the light is changed (in FIG. 1, 90° counterclockwise) by the quick-return mirror 12. The light further passes through the focusing screen 13 and through the intra-viewfinder liquid crystal display unit 41 (inside a display screen). The traveling direction of the light is changed inside the pentagonal prism 14, as illustrated in FIG. 1. The pentagonal prism 14 delivers the light to an observer side (observation part) at the same angle as that at which the light is incident on the lens 5 from the object side, so that the observer can check the object being imaged. The light passed through the focusing screen 13 and the photometric range of the intra-viewfinder liquid crystal display unit 41 reaches the AE sensor 15 (photometric unit), whereby the amount of the light is measured (by photometry). The photometric range is configured to be changeable within a range where the AE sensor 15 can perform photometry.

An extra-viewfinder (external viewfinder) liquid crystal display unit 43 is a display unit on which various setting values of the camera, including a shutter speed and aperture, are displayed via an extra-viewfinder liquid crystal driving circuit 44. The extra-viewfinder liquid crystal display unit 43 is arranged in a position different from where the liquid crystal display unit 25 for displaying an image is (for example, extra-viewfinder liquid crystal display unit 43 is arranged on a top portion of the imaging apparatus 200 as illustrated in FIG. 2A).

An operation unit 70 includes various operation members that are arranged on the rear surface or the top surface of the imaging apparatus 200 as illustrated in FIG. 2B. The various operation members of operation unit 70 serve as input units for receiving operations from the user. The operation unit 70 includes operation members including at least a release button 201, a main dial 202, a sub dial 203, a power switch 204, a range finding point selection button 205, a menu button 206, an image capturing mode change switch 210, and a recording image quality change button 212.

The system control unit 50 is a control unit that controls various parts included in the imaging apparatus 200. The system control unit 50 loads and executes a program recorded in the nonvolatile memory 38, using the volatile memory 39 as a work memory, to perform various types of processing illustrated in the flowchart of FIG. 3 to be described below.

The release button 201 is a button for issuing an image capturing preparation instruction and an image capturing instruction. When the release button 201 is half-pressed, a not-illustrated switch 1 turns on, whereby a luminance measurement of an object and focusing are performed. When the release button 201 is fully pressed, a not-illustrated switch 2 turns on, whereby the focal plane shutter 17 is opened for a predetermined time to perform an operation for capturing and recording a still image.

The main dial 202 is a rotating operation member. The user rotates the main dial 202 to set setting values, such as the shutter speed and aperture, and to perform a fine adjustment of a magnifying factor in a magnification mode.

The sub dial 203 is a rotating operation member. The user rotates the sub dial 203 to set setting values, such as the aperture and exposure correction, and to perform a forward scrolling operation of an image in an image display state.

The power switch 204 is an operation member for turning on and off the power supply.

The menu button 206 is a button for displaying various setting screens on the liquid crystal display unit 25.

The range finding point selection button 205 is a button for entering a mode in which to select a range finding region for automatic focusing.

The present exemplary embodiment deals with an example where items are changed and set by pressing selection buttons and rotating the dials. To change items, a liquid crystal display unit 25 of touch panel type may be used to perform a menu setting and various settings. The user can set items by operating the liquid crystal display unit 25 of touch panel type or by operating the selection buttons while viewing the intra-viewfinder liquid crystal display unit 41. However, when the user holds the imaging apparatus 200 and changes settings while looking through the viewfinder 16 and viewing the intra-viewfinder liquid crystal display unit 41, the physical buttons and dials are highly operable. Therefore, a method for setting items by button and dial operations will be described.

Item setting processing according to the first exemplary embodiment will be described with reference to FIGS. 3A, 3B, 4A, and 4B.

Figures 3, 3A:
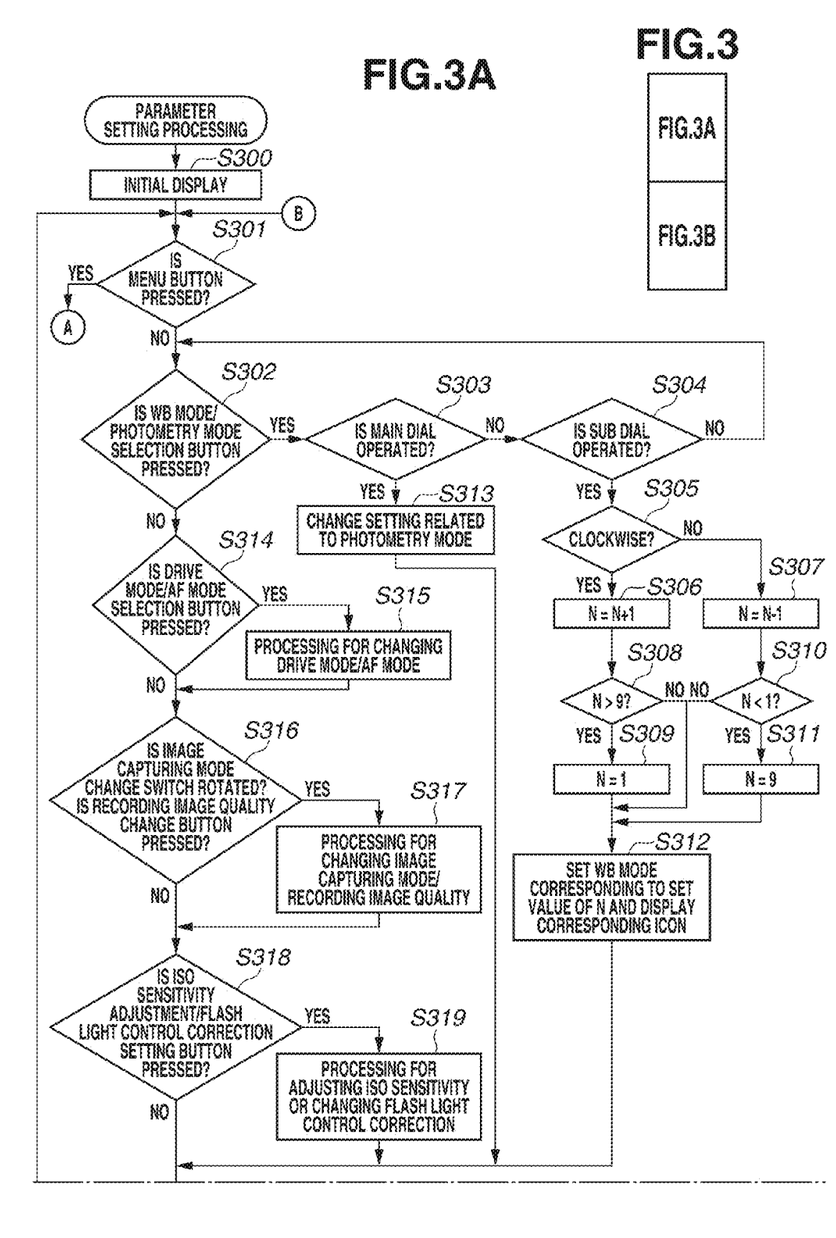
FIGS. 3A and 3B are flowcharts illustrating parameter setting processing according to an exemplary embodiment.
Figure 3B:
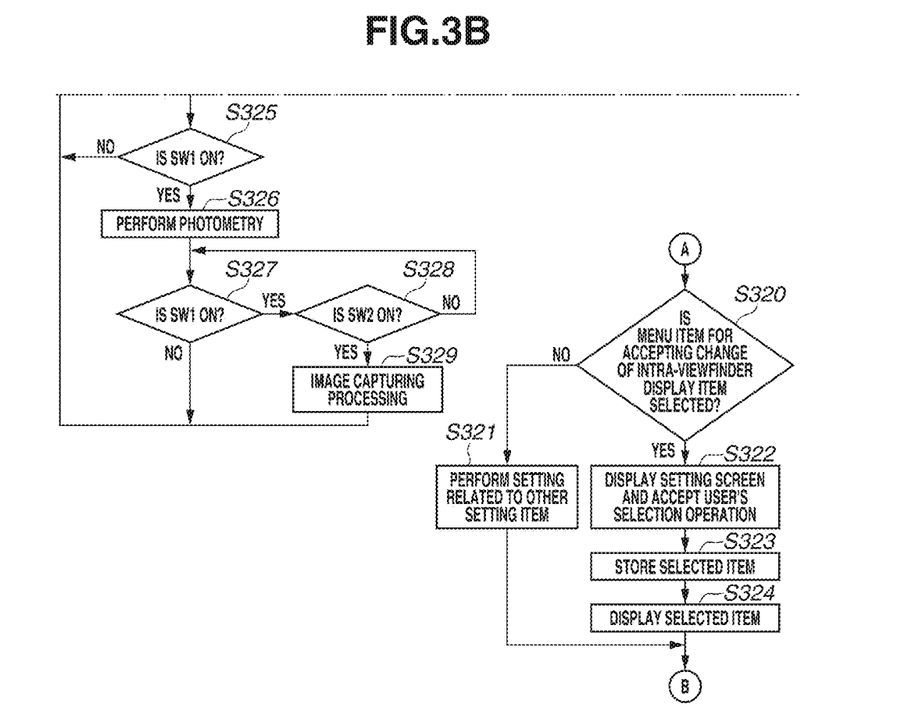

The flowcharts of FIGS. 3A and 3B illustrate a flowchart of parameter setting processing according to the present exemplary embodiment. Parameters related to image capturing include various setting values related to image capturing processing, such as white balance (WB), photometry, drive, AF (range finding), an image capturing mode, recording image quality, ISO sensitivity, and flash light control. The user can obtain a desired image by appropriately setting the parameters. The user can perform imaging without missing photo opportunities by quickly setting and checking the parameters. The setting values of the parameters can be changed during standby for image capturing or during image reproduction.

Figure 4A:
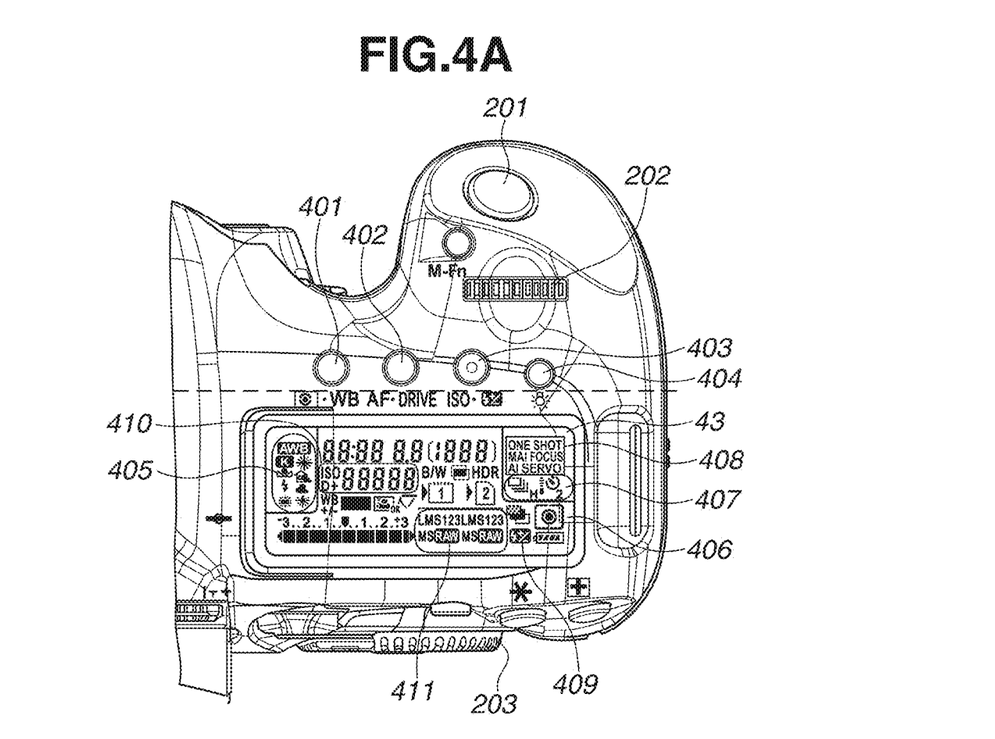
FIG. 4A is a diagram illustrating a display example of an extra-viewfinder liquid crystal display unit.

FIG. 4A is a diagram illustrating details of some of the operation members of the operation unit 70 and the extra-viewfinder liquid crystal display unit 43. Items can be displayed on the extra-viewfinder liquid crystal display unit 43 illustrated in FIG. 4A, the intra-viewfinder liquid crystal display unit 41 illustrated in FIG. 4B, and the liquid crystal display unit 25 illustrated in FIG. 1. The user can set the parameters while viewing these display units 43, 41, and 25. Such processing is implemented by loading a program recorded in the nonvolatile memory 38 into the volatile memory 39 and executing the program by the system control unit 50.

In step S300, the system control unit 50 displays an initial display on the extra-viewfinder liquid crystal display unit 43 and the intra-viewfinder liquid crystal display unit 41. For the initial display, the system control unit 50 displays settings of parameters that have been set by the user before power-off and stored in the nonvolatile memory 38 or parameters that are set as initial settings in the imaging apparatus 200.

In step S301, the system control unit 50 determines whether the menu button 206 is pressed. In a case where the menu button 206 is determined to be pressed (YES in step S301), the processing proceeds to step S320. In a case where the menu button 206 is determined not to be pressed (NO in step S301), the processing proceeds to step S302.

In step S302, the system control unit 50 determines whether a WB mode/photometry mode selection button 401 among setting buttons illustrated in FIG. 4A is pressed. In a case where the WB mode/photometry mode selection button 401 is determined to be pressed (YES in step S302), the processing proceeds to step S303. In a case where the WB mode/photometry mode selection button 401 is determined not to be pressed (NO in step S302), the processing proceeds to step S314.

In step S303, the system control unit 50 determines whether the main dial 202 illustrated in FIG. 4A is operated. In a case where the main dial 202 is determined to be operated (YES in step S303), the processing proceeds to step S313. In a case where the main dial 202 is determined not to be operated (NO in step S303), the processing proceeds to step S304.

In step S304, the system control unit 50 determines whether the sub dial 203 illustrated in FIG. 4A is operated. In a case where the sub dial 203 is determined to be operated (YES in step S304), the processing proceeds to step S305. In a case where the sub dial 203 is determined not to be operated (NO in step S304), the processing returns to step S302.

In step S305, the system control unit 50 determines whether the sub dial 203 is rotated clockwise. In a case where the sub dial 203 is determined to be rotated clockwise (YES in step S305), the processing proceeds to step S306. In a case where the sub dial 203 is determined not to be rotated clockwise (NO in step S305), the processing proceeds to step S307.

In step S306, the system control unit 50 increases a WB icon setting value N by one in value.

Figure 5A:
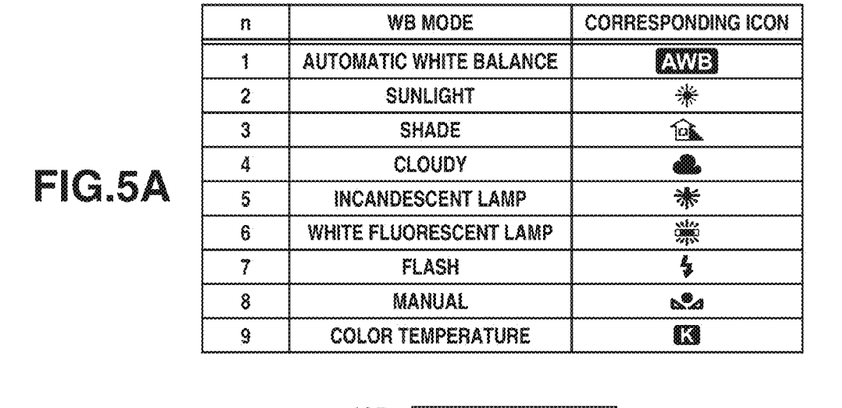
FIGS. 5A, 5B, and 5C are diagrams illustrating display examples of icons corresponding to white balance.
Figure 5B:
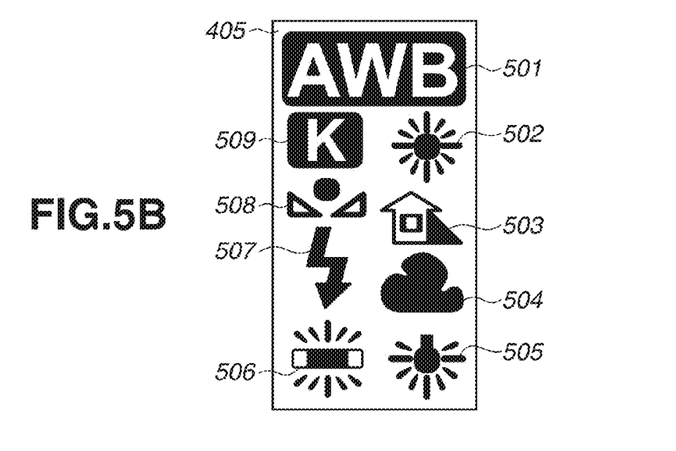
Figure 5C:
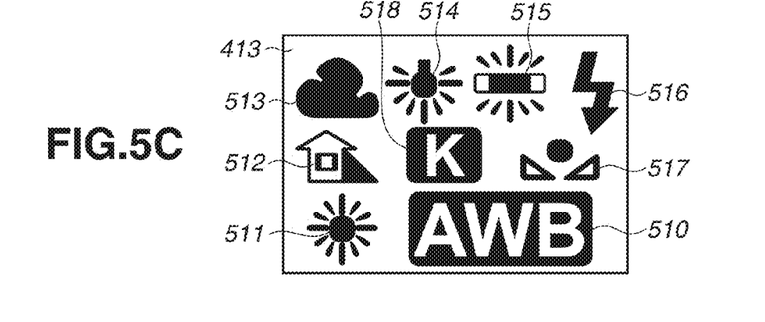

FIGS. 5A to 5C are diagrams each illustrating icons representing respective WB modes and a layout thereof. FIG. 5A is a diagram illustrating the values of the WB icon setting value N of 1 to 9, the respective WB modes, and the icons in association with each other. FIG. 5B is a diagram illustrating a layout example of WB icons in the extra-viewfinder liquid crystal display unit 43. FIG. 5C is a diagram illustrating a layout example of WB icons in the intra-viewfinder liquid crystal display unit 41. As the WB icon setting value N is changed in value, the WB mode corresponding to the value of N is set (sequentially selected) and the set WB mode is stored in the volatile memory 39.

In step S307, the system control unit 50 decreases the WB icon setting value N by one in value.

In step S308, the system control unit 50 determines whether the value of N set in the previous step S306 is greater than nine. In a case where the value of N is determined to be greater than nine (YES in step S308), the processing proceeds to step S309. In a case where the value of N is determined not to be greater than nine (NO in step S308), the processing proceeds to step S312.

In step S309, the system control unit 50 sets N=1. As the sub dial 203 is rotated by a predetermined amount, the value of N increases or decreases one by one in the range of 1 to 9. When the value of N is nine in step S302 and the sub dial 203 is rotated clockwise, N becomes one in value.

In step S310, the system control unit 50 determines whether the value of N set in the previous step S307 is smaller than one. In a case where the value of N is determined to be smaller than one (YES in step S310), the processing proceeds to step S311. In a case where the value of N is determined not to be smaller than one (NO in step S310), the processing proceeds to step S312.

In step S311, the system control unit 50 sets N=9. As the sub dial 203 is rotated by a predetermined amount, the value of N (1 to 9) increases or decreases one by one. When the value of N falls below one in step S307, N becomes nine in value.

In step S312, the system control unit 50 sets the WB mode corresponding to the set value of N. The system control unit 50 further displays an icon (display item) corresponding to the set WB mode in a WB display 405 displayed in the extra-viewfinder liquid crystal display unit 43 illustrated in FIG. 4A and a WB display 413 displayed in the intra-viewfinder liquid crystal display unit 41 illustrated in FIG. 4B. The WB display 405 displayed in the extra-viewfinder liquid crystal display unit 43 illustrated in FIG. 4A and the WB display 413 displayed in the intra-viewfinder liquid crystal display unit 41 illustrated in FIG. 4B will be described below. A description of a display in the liquid crystal display unit 25 will be omitted. The WB display 405 and the WB display 413 each display nine icons, which are illustrated for a case where all the icons are displayed for the sake of convenience. In fact, only one icon corresponding to the set WB mode among the nine icons is displayed. Displays indicating setting values of other items in the extra-viewfinder liquid crystal display unit 43 and the intra-viewfinder liquid crystal display unit 41 are also illustrated for a case where all the displayable icons are displayed, for the sake of convenience. In fact, icons or numerals that are set (or selected) are actually displayed. In the following description, the intra-viewfinder liquid crystal display unit 41 is described to not display different icons in an identical area (i.e., to display icons without overlap).

In step S313, the system control unit 50 changes a setting related to a photometry mode. Examples of photometry modes include evaluation photometry in which an exposure value is automatically corrected, partial photometry in which a photometric value in a predetermined range in the center is used, spot photometry in which a photometric value in a predetermined narrower range in the center is used, and center average photometry in which an average photometric value of the entire area is used with a weight on the center. The system control unit 50 calculates an appropriate exposure value according to the photometry result, and performs image capturing. The system control unit 50 accepts an operation by which the user selects any one of the settable photometry modes, sets the selected photometry mode, and displays an icon corresponding to the set photometry mode in a photometry display 406 of the extra-viewfinder liquid crystal display unit 43 and a photometry display 416 of the intra-viewfinder liquid crystal display unit 41.

In a case where the main dial 202 or the sub dial 203 is operated after a lapse of six seconds from the pressing of the WB mode/photometry mode selection button 401 in step S302, the system control unit 50 does not change the setting of the WB mode or the photometry mode. If another setting button is pressed and the main dial 202 or the sub dial 203 is operated, the system control unit 50 does not change the setting of the WB mode or the photometry mode, either, but changes the setting related to the setting item corresponding to the setting button pressed. The expiration time of a setting button does not need to be six seconds and may have other values, for example, four seconds or one minute. The last-pressed setting button may be maintained effective until another setting button is pressed. A setting related to an item other than the WB mode/photometry mode may be changed by setting an image capturing condition on a menu setting screen. In such a case, the setting of the WB mode or the photometry mode is not able to be changed unless the WB mode/photometry mode selection button 401 is pressed again.

In step S314, the system control unit 50 determines whether a drive mode/AF mode selection button 402 illustrated in FIG. 4A is pressed. In a case where the drive mode/AF mode selection button 402 is determined to be pressed (YES in step S314), the processing proceeds to step S315. In a case where the drive mode/AF mode selection button 402 is determined not to be pressed (NO in step S314), the processing proceeds to step S316.

In step S315, the system control unit 50 performs processing for changing the drive mode or the AF mode, and displays an icon corresponding to the setting-changed mode in a drive display 407 or an AF display 408 of the extra-viewfinder liquid crystal display unit 43. Similarly, the system control unit 50 displays a corresponding icon in a drive display 414 or an AF display 415 of the intra-viewfinder liquid crystal display unit 41.

In step S316, the system control unit 50 determines whether the image capturing mode change switch 210 is rotated, and whether the recording image quality change button 212 is pressed. In a case where the image capturing mode change switch 210 or the recording image quality change button 212 is determined to be operated (YES in step S316), the processing proceeds to step S317. In a case where neither the image capturing mode change switch 210 nor the recording image quality change button 212 is determined to be operated (NO in step S316), the processing proceeds to step S318.

In step S317, the system control unit 50 performs processing for changing the image capturing mode, in a case where the image capturing mode change switch 210 is rotated in step S316. The system control unit 50 performs processing for changing the recording image quality, in a case where the recording image quality change button 212 is pressed. The recording image quality is changed by operating of the main dial 202 after the pressing of the recording image quality change button 212. The system control unit 50 displays an icon according to the changed setting in a recording image quality display 411 of the extra-viewfinder liquid crystal display unit 43. In a case where the image capturing mode is changed, the system control unit 50 displays an icon corresponding to the changed mode in an image capturing mode display 412 of the intra-viewfinder liquid crystal display unit 41.

In step S318, the system control unit 50 determines whether an ISO sensitivity adjustment/flash light control correction setting button 403 is pressed. In a case where the ISO sensitivity adjustment/flash light control correction setting button 403 is determined to be pressed (YES in step S318), the processing proceeds to step S319. In a case where the ISO sensitivity adjustment/flash light control correction setting button 403 is determined not to be pressed (NO in step S318), the processing proceeds to step S325.

In step S319, the system control unit 50 performs processing for adjusting the ISO sensitivity or changing a flash light control correction. The system control unit 50 displays the set numerical value in an ISO sensitivity display 410 or a flash light control correction display 409 of the extra-viewfinder liquid crystal display unit 43.

Figure 4B:
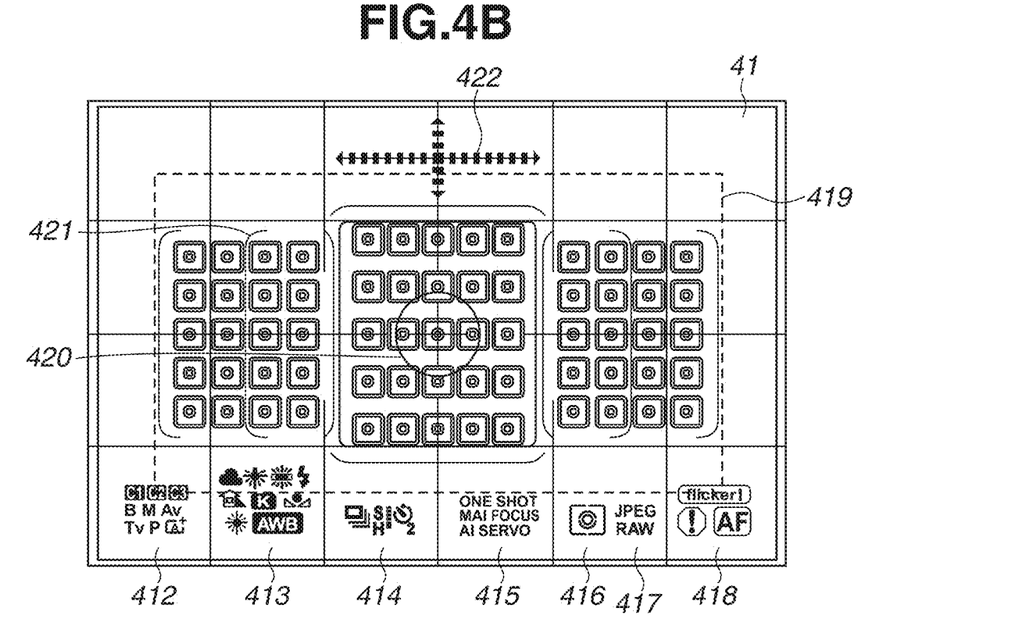
FIG. 4B is a diagram illustrating a display example of an intra-viewfinder liquid crystal display unit.

The flow described above is predicated on that all the items illustrated in FIG. 4B are displayed on the intra-viewfinder liquid crystal display unit 41. However, the user may set which items to display.

Figure 6A:
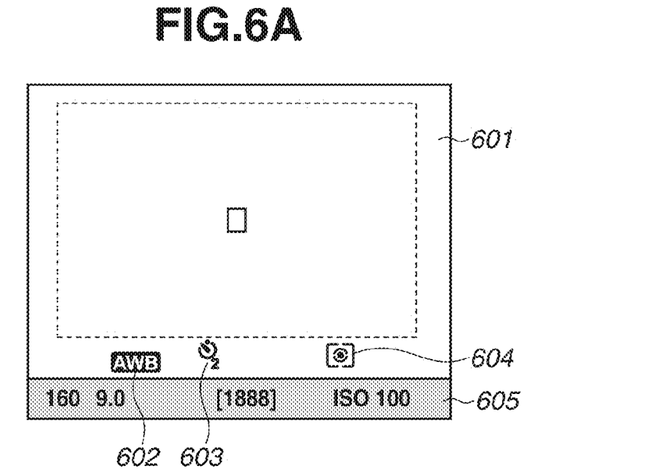
FIG. 6A is a diagram illustrating a display example of the intra-viewfinder liquid crystal display unit.
Figure 6B:
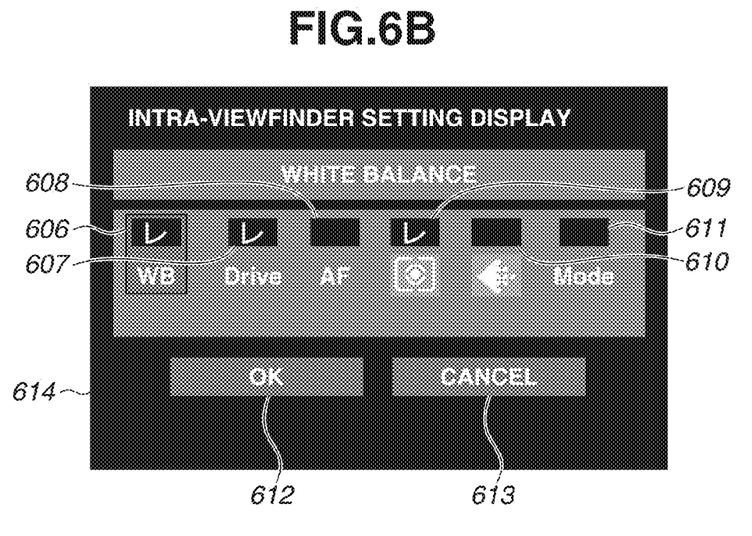
FIG. 6B is a diagram illustrating a display example of a setting screen.

FIG. 6A is a diagram illustrating a display example of the intra-viewfinder liquid crystal display unit 41 when some of the items are set to be displayed in the present exemplary embodiment. FIG. 6B is a diagram illustrating a display example of a setting screen for setting the display of FIG. 6A.

In step S320, the system control unit 50 determines whether a menu item for accepting a change of an intra-viewfinder display item is selected from among a plurality of menu items displayed on a menu screen. In a case where the menu item is determined to be selected (YES in step S320), the processing proceeds to step S322. In a case where the menu item is determined not to be selected (NO in step S320), the processing proceeds to step S321.

In step S321, the system control unit 50 performs a setting related to a setting item other than an intra-viewfinder setting item. The settings related to another setting item may include a setting related to image capturing, such as white balance and AF, a setting related to reproduction, and a setting change about electronic sound and date.

In step S322, the system control unit 50 displays a setting screen on the liquid crystal display unit 25 and accepts the user's operation for selecting any one of a plurality of display items displayable on the intra-viewfinder liquid crystal display unit 41.

FIG. 6B illustrates an example of the setting screen from which the user can select display items to be displayed on the intra-viewfinder liquid crystal display unit 41. A setting screen 614 illustrated in FIG. 6B displays a WB display setting 606, a drive display setting 607, an AF display setting 608, a photometry display setting 609, a card/image size selection display setting 610, an image capturing mode display setting 611, and checkboxes for selecting the respective items. The setting screen 614 may display items other than the foregoing. On the setting screen 614, the user can select any one of the items and press an OK button 612 to check on the item to be displayed on the intra-viewfinder liquid crystal display unit 41. In a case where a cancel button 613 is selected, the item(s) to be displayed remain(s) unchanged from before the setting.

In step S323, the system control unit 50 stores the item selected in step S322 into the nonvolatile memory 38. Since the item is stored in the nonvolatile memory 38, the set item can be displayed on the intra-viewfinder liquid crystal display unit 41 even if the imaging apparatus 200 is powered off and on again.

In step S324, the system control unit 50 displays the item selected in step S322 on the intra-viewfinder liquid crystal display unit 41. FIG. 6A illustrates a setting display screen 601 which is another display example of the intra-viewfinder liquid crystal display unit 41. Since the WB mode, the drive mode, and the photometry mode are selected in FIG. 6B, the setting display screen 601 displays icons corresponding to the respective set modes as illustrated in FIG. 6A. The setting display screen 601 displays automatic white balance 602 which is one of possible WB modes and is currently set, a self-timer two-second display 603 which is one of possible drive mode settings, and evaluation photometry 604 which indicates the setting of the photometry mode. As illustrated in the setting display screen 601, the intra-viewfinder liquid crystal display unit 41 may include a region 605 of lower transmittance in a region outside the photometric range. The values of the shutter speed, numerical aperture, the remaining number of exposures, and the ISO sensitivity may be displayed in the region 605.

According to the present exemplary embodiment, the user can thus select the setting items to be displayed on the intra-viewfinder liquid crystal display unit 41.

Suppose that the user presses the menu button 206 and performs a setting from among the menu items. During the process, in step S321, the intra-viewfinder liquid crystal display unit 41 displays even the item(s) that has/have been set not to be displayed. After the end of the setting (in step S323 after the completion of the item selection), such item(s) is/are hidden again. Since the item(s) set not to be displayed is/are also displayed during a setting change, the user can check even the hidden item(s) through the viewfinder 16 while making the setting change.

In step S325, the system control unit 50 determines whether the release button 201 is half-pressed to turn on a first shutter switch signal SW1. In a case where the first shutter switch signal SW1 is on (YES in step S325), the processing proceeds to step S326. In a case where the first shutter switch signal SW1 is not on (NO in step S325), the processing returns to step S301.

In step S326, the system control unit 50 performs AF processing (range finding) to focus the lens 5 on an object, and performs AE processing (photometry) to determine the aperture value and the shutter speed (exposure time) of the focal plane shutter 17.

In step S327, the system control unit 50 determines whether the release button 201 continues being half-pressed to maintain the first shutter switch signal SW1 on. In a case where the first shutter switch signal SW1 is on (YES in step S327), the processing proceeds to step S328. In a case where the first shutter switch signal SW1 is not on (NO in step S327), the processing proceeds to step S301.

In step S328, the system control unit 50 determines whether the release button 201 is fully pressed to turn on a second shutter switch signal SW2. In a case where the second shutter switch signal SW2 is on (YES in step S328), the processing proceeds to step S329. In a case where the second shutter switch signal SW2 is not on (NO in step S328), the processing returns to step S327.

In step S329, the system control unit 50 performs image capturing processing.

A configuration and parameter display of the imaging apparatus 200 to which an exemplary embodiment of the present invention is applicable will be described with reference to FIGS. 4A and 4B.

As illustrated in FIG. 4A, setting buttons including the WB mode/photometry mode selection button 401, the drive mode/AF mode selection button 402, the ISO sensitivity adjustment/flash light control correction setting button 403, and a liquid crystal on-off switch button 404 are arranged on the imaging apparatus 200. When the WB mode/photometry mode selection button 401 is pressed and then the main dial 202 is operated, the imaging apparatus 200 changes the photometry mode. When the sub dial 203 is operated, the imaging apparatus 200 changes the WB mode. Similarly, when the drive mode/AF mode selection button 402 is pressed and then the main dial 202 is operated, the imaging apparatus 200 changes the AF mode. When the sub dial 203 is operated, the imaging apparatus 200 changes the drive mode. When the ISO sensitivity adjustment/flash light control correction setting button 403 is pressed and then the main dial 202 is operated, the imaging apparatus 200 performs flash light control correction. When the sub dial 203 is operated, the imaging apparatus 200 performs an ISO sensitivity adjustment. When the liquid crystal on-off switch button 404 is pressed, the extra-viewfinder liquid crystal display unit 43 is switched on and off accordingly.

The extra-viewfinder liquid crystal display unit of FIG. 4A displays the WB display 405, the ISO sensitivity display 410, the recording image quality display 411, the flash light control correction display 409, the photometry display 406, the drive display 407, and the AF display 408. All the icons indicating the currently-set modes of the respective items (icons corresponding to the currently-set modes of the respective items) displayed on the intra-viewfinder liquid crystal display unit 41 and the extra-viewfinder liquid crystal display unit 43 are not necessarily the same. Even the same items may be displayed in different display positions or layouts.

The intra-viewfinder liquid crystal display unit 41 of FIG. 4B can display the image capturing mode display 412, the WB display 413, the drive display 414, the AF display 415, the photometry display 416, the recording image quality display 417, and a warning display 418 in order from the left on the bottom side among four sides (i.e., the top, bottom, right, and left). The displays 412 to 418 are displayed in a row so that the user can quickly check the setting states of all the parameters. The intra-viewfinder liquid crystal display unit 41 can further display a level display 422 which indicates the tilt of the imaging apparatus 200, a photometry frame 419 which indicates the range capable of photometry by the AE sensor 15, area automatic focusing frames 421, and a spot photometric range 420. Light passed through the focusing screen 13 and the range of the photometry frame 419 displayed on the intra-viewfinder liquid crystal display unit 41 is measured by the AE sensor 15 illustrated in FIG. 1. The light incident from the object side passes through the optical path of the foregoing light to be measured before reaching the AE sensor 15. The focusing screen 13 and the intra-viewfinder liquid crystal display unit 41 are included in the path. If there is a display that does not transmit light within the photometry frame 419 of the intra-viewfinder liquid crystal display unit 41, the light fails to pass through the portion (region) of the display, or the amount of the passed-light decreases. In such cases, even if there actually is light in the photometry region corresponding to the portion of the display, the AE sensor 15 detects that the light is absent or of a smaller amount than actually is. The level display 422, the photometry frame 419, the area automatic focusing frames 421, and the spot photometric range 420 are displayed in thin lines not to affect the photometry. The level display 422, the photometry frame 419, the area automatic focusing frames 421, and the spot photometric range 420 may be hidden.

The parameters displayed in the intra-viewfinder liquid crystal display unit 41 and the extra-viewfinder liquid crystal display unit 43 are arranged according to the positions of the main dial 202 and the sub dial 203 for changing settings, so that the user can intuitively perform operations by associating the operation positions with the display positions of the parameters being changed. When the user views the imaging apparatus 200 illustrated in FIG. 2B from the side of the liquid crystal display unit 25, the main dial 202 comes to the right of the sub dial 203. The display items corresponding to the respective items are displayed in different positions depending on which of the main dial 202 and the sub dial 203 can be used to change a setting (the positional relationship corresponds to the positions of the main dial 202 and the sub dial 203 that can be used to change a setting). More specifically, out of two setting items of which a setting can be changed by pressing the same setting button (401 to 404), the icons of the item that is changeable by operating the main dial 202 are displayed to the right of those of the items changeable by operating the sub dial 203. For example, the WB mode and the photometry mode are changeable by pressing the WB mode/photometry mode selection button 401. Out of the WB display 413 and the photometry display 416 of the intra-viewfinder liquid crystal display unit 41, the photometry display 416 that is operable by the main dial 202 which is provided on the right side is displayed to the right.

FIG. 5C illustrates an enlarged view of the WB display 413 in the intra-viewfinder liquid crystal display unit 41 illustrated in FIG. 4B. As illustrated in FIG. 5C, the intra-viewfinder liquid crystal display unit 41 displays a cloudy display 513, an incandescent lamp display 514, a white fluorescent lamp display 515, and a flash display 516 in the top row. A shade display 512, a color temperature display 518, and a manual display 517 are displayed in the middle row. A sunlight display 511 and an automatic white balance (AWB) display 510 are displayed in the bottom row. The WB display 413 of the intra-viewfinder liquid crystal display unit 41 illustrated in FIG. 4B includes display items arranged to overlap the photometry frame 419. The display items in the top row of the WB display 413 are arranged inside the photometry frame 419. The display items in the middle and bottom rows are arranged outside the photometry frame 419. In a case where the display items arranged inside the photometry frame 419 are selected, the display items are displayed inside the photometry frame 419, whereby the photometry result can be affected. The AWB display 510 occupies the largest (maximum) display area on the liquid crystal of the intra-viewfinder liquid crystal display unit 41 among the icons indicating the WB mode. The effect on the photometry result can be accordingly greater. As employed herein, the display area refers to the black area, or the area of the portion displayed to block the optical path, in the display unit. Display items having larger display areas are then arranged outside the photometry frame 419 (outside the region corresponding to the photometric range). Display items having smaller display areas than the display items of large display areas are arranged inside the photometry frame 419 (inside the region corresponding to the photometric range). In such a manner, the effect on the photometry result can be reduced. In other words, icons having smaller display areas (or an icon having the smallest display area) can be arranged inside the photometry frame 419 to reduce the effect on the photometry result as compared to when icons having larger display areas are. In such a manner, in a case where the extra-viewfinder liquid crystal display unit 43 and the intra-viewfinder liquid crystal display unit 41 display display items in a region including where the photometry frame 419 overlaps, display items having different areas are arranged in different layouts depending on the display areas. In addition, display items having larger display areas are arranged outside ones having smaller display areas (outside the photometry frame 419). Displaying the display items having larger display areas outside the photometry frame 419 and displaying closer to the outer frame of the intra-viewfinder liquid crystal display unit 41 reduces the areas of displays overlapping a center portion (essential portion) of the object and improves the visibility of the object image when the photographer observes the object.

In FIGS. 5B and 5C, the AWB display and the display items having display areas smaller than that of the AWB display are arranged in different layouts. In FIG. 5B, the display items having display areas smaller than that of the AWB display 501 are located below the AWB display 501. In FIG. 5C, display items having display areas smaller than that of the AWB display 501 are located above the AWB display 501.

A display method related to a setting change of icons corresponding to respective WB modes in the WB display 405 in the extra-viewfinder liquid crystal display unit 43 illustrated in FIG. 4A and the WB display 413 in the intra-viewfinder liquid crystal display unit 41 illustrated in FIG. 4B will be described.

When the sub dial 203 is rotated clockwise from N=1, the WB display 405 in the extra-viewfinder liquid crystal display unit 43 of FIG. 4A displays icons corresponding to N=1 to 9 in order.

FIG. 5B illustrates the WB display 405 in the extra-viewfinder liquid crystal display unit 43. When the sub dial 203 is rotated clockwise, the WB display 405 displays icons in the following order according to the rotation direction of the sub dial 203, starting at the icon corresponding to N=1. That is, the AWB display 501, the sunlight display 502, the shade display 503, the cloudy display 504, the incandescent lamp display 505, the white fluorescent lamp display 506, the flash display 507, the manual display 508, and the color temperature display 509 are displayed one by one in order. When the sub dial 203 is rotated counterclockwise, the displays 501 to 509 are switched in reverse order to that of the clockwise operation, according to the rotation of the sub dial 203. In such a manner, the direction of increase or decrease of the value of N to which the set WB mode corresponds is changed according to the rotation direction (operation direction) of the sub dial 203. The display of the WB display 405 visible to the user is also switched according to the rotation.

A display method related to a setting change of the WB display 413 in the intra-viewfinder liquid crystal display unit 41 illustrated in FIG. 4B will be described. Similar to the WB display 405 in the extra-viewfinder liquid crystal display unit 43 illustrated in FIG. 4A, when the sub dial 203 is rotated clockwise from N=1, the icons corresponds to N=1 to 9 are displayed in order. As illustrated in FIGS. 5B and 5C, in the WB display 413, the icons (display items) are displayed in positions different from in the WB display 405. The layout of the nine icons is also different. However, the switching order of display and that the displays are switched according to the rotation direction of the sub dial 203 are the same. In both the WB display 413 and the WB display 405, icons (display items) adjoining (consecutive) in the switching order of display are arranged to adjoin each other. More specifically, when the sub dial 203 is rotated clockwise, as illustrated in FIG. 5C, the icons displayed in the WB display 413 are switched in the following order, starting at the icon corresponding to N=1. That is, the AWB display 510, the sunlight display 511, the shade display 512, the cloudy display 513, the incandescent lamp display 514, the white fluorescent lamp display 515, the flash display 516, the manual display 517, and the color temperature display 518 are displayed one by one in order. When the sub dial 203 is rotated counterclockwise, the displays 510 to 518 are switched in reverse order to that of the clockwise operation, according to the rotation of the sub dial 203. In such a manner, the displays 510 to 518 of the WB display 413 visible to the user in the intra-viewfinder liquid crystal display unit 41 are also switched according to the rotation direction of the sub dial 203.

To avoid affecting the photometry result, the intra-viewfinder liquid crystal display unit 41 displays the display items of the respective items in a layout different from that of in the extra-viewfinder liquid crystal display unit 43. Even in such a case, the displays 510 to 518 are switched in order according to the rotation direction of the sub dial 203. Since the icons adjoining in the switching order according to the rotation of the sub dial 203 are displayed in adjoining positions even in the intra-viewfinder liquid crystal display unit 41, the user who changes a setting can immediately check the icon corresponding to the changed mode easily.

According to the exemplary embodiment described above, the effect of the display of the display items overlapping the photometric range on the photometry result can be reduced. Consequently, a display of a display unit not including the photometric range (such as the liquid crystal display unit on the rear or top surface of the imaging apparatus 200) can be displayed in such a manner that the user can check the display while looking through the viewfinder 16, and perform image capturing while viewing the display, without increasing the effect on the photometry. The order of change (order of display and setting during a change) is determined according to the rotation direction of the main dial 202 or the sub dial 203. The user's operability is therefore not impaired even if the display items of the intra-viewfinder liquid crystal display unit 41 are arranged in a layout different from that of the extra-viewfinder liquid crystal display unit 43 for reducing the effect on the photometry result. Moreover, the effect on the photometry result can be reduced even under the constraint that the display items be arranged and displayed in adjacent positions within a limited area. According to the present exemplary embodiment, the effect on the photometry result can be reduced by the display method (the layout of the display items). This reduces the need to perform correction processing on the photometry result, and can suppress correction errors that may occur in a case where a correction is performed.

The number of icons to be displayed does not need to be nine. The present exemplary embodiment is applicable in a case where a plurality of display items is displayed on a display unit that includes a photometric range. The present exemplary embodiment has dealt with a display example of the icons indicating the WB mode which is one of the plurality of parameters. However, the parameter of which to arrange icons differently between the intra-viewfinder liquid crystal display unit 41 and the extra-viewfinder liquid crystal display unit 43 is not limited to the WB mode. The present exemplary embodiment has also dealt with the arrangement of the nine items indicating WB (only a set item among the nine items is displayed). However, an exemplary embodiment of the present invention may be applied to a plurality of display items, such as those of the image capturing mode display 412, the WB display 413, and the drive display 414. For example, among a plurality of display items of the image capturing mode display 412, the WB display 413, and the drive display 414, an item which has been set is displayed for each display. In such a case, an average display area of a plurality of display items of each display may be determined, and the displays of larger average display areas may be arranged in farther positions from the center of the photometry frame 419. Displaying the displays of larger average display areas in farther positions from the center of the photometry frame 419 can reduce the effect on the photometry result as compared to when the displays of larger average display areas are displayed in closer positions to the center of the photometry frame 419.

In the foregoing description, different parameters are described to be changed depending on whether the main dial 202 is operated or the sub dial 203 is operated after the pressing of the same setting button. However, the same parameter may be able to be changed both by operating the main dial 202 and by operating the sub dial 203. For example, a parameter of which the user's use frequency is high can be operated by both the main dial 202 and the sub dial 203 after the pressing of the setting button.

The display items displayed on the intra-viewfinder liquid crystal display unit 41 may be turned off according to turning-on of the first shutter switch signal SW1. Photometry is usually performed according to the turning-on of the first shutter switch signal SW1. The photometry result therefore will not be affected if the display items are hidden (turned off) during photometry (period in which photometry is performed) after the turning-on of the first shutter switch signal SW1. Alternatively, photometry may be performed for only a certain period of time after the turning-on of the first shutter switch signal SW1 without displaying the display items. After a lapse of the certain period, the photometry may be stopped and the obtained photometric value may be displayed. In such a manner, the intra-viewfinder liquid crystal display unit 41 can be controlled to reduce the effect of the display of the display items displayed in the intra-viewfinder liquid crystal display unit 41 on the photometry result regardless of the display positions and a display state of the display items. The hidden display items are turned on and displayed according to turning-off of the first shutter switch signal SW1.

Figure 7A:
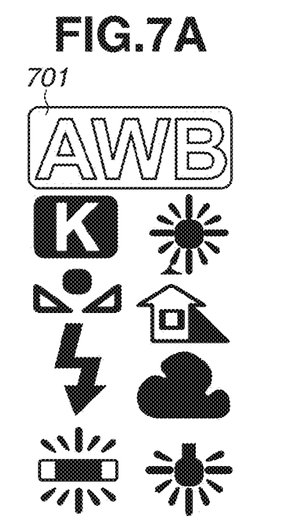
FIGS. 7A, 7B, 7C, and 7D are diagrams each illustrating a display example of icons corresponding to white balance.
Figure 7B:
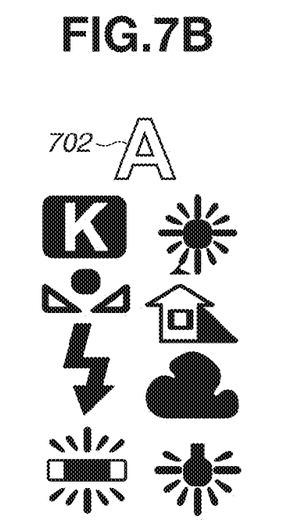
Figure 7C:
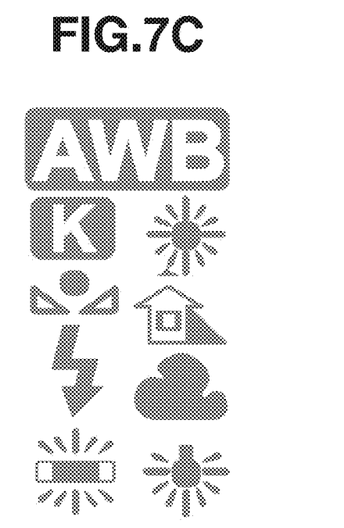
Figure 7D:
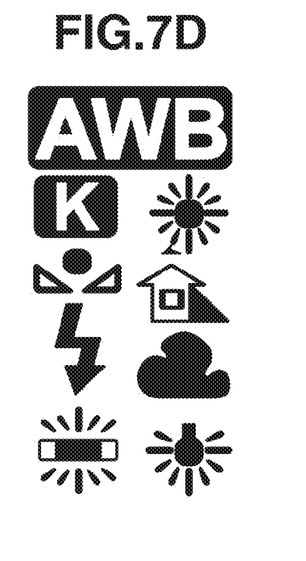

Display examples of icons in the WB mode according to a second exemplary embodiment will be described with reference to FIGS. 7A to 7D. The second exemplary embodiment is similar to the first exemplary embodiment except the displays 510 to 518 of FIG. 5C and the processes in the flowchart of FIG. 3. According to the first exemplary embodiment, the icons are described to be arranged according to their display areas. According to the display method of the present exemplary embodiment, the effect on the photometry result can be reduced regardless of the arrangement of icons by displaying the icons in consideration of transmittance. FIGS. 7A, 7B, and 7C are diagrams illustrating display examples of the WB display 413 on the intra-viewfinder liquid crystal display unit 41 according to the present exemplary embodiment. FIG. 7D illustrates a display example of the WB display 405 on the extra-viewfinder liquid crystal display unit 43 according to the present exemplary embodiment. The icons in the display examples of the WB mode in FIGS. 7A, 7B, and 7C are displayed in the same display positions and the same layout as those of the corresponding icons in the display of FIG. 7D displayed on the extra-viewfinder liquid crystal display unit 43.

As illustrated in FIG. 7A, an AWB display 701 is rendered in outline. The outlined portion shall be transmissive. In such a manner, only an icon having a predetermined display area or more is changed from black into outlines to increase transmittance. This can reduce the effect on the photometry result even if the icon has a predetermined display area or more. Even if the AWB display 701 among the nine icons is displayed in a position overlapping the inside of the photometry frame 419, the display of increased transmittance (in outline) can reduce the effect on the photometry result.

In FIG. 7B, an AWB display 702 is expressed by a single letter "A" in outline. Only an icon having a predetermined display area or more is changed from black into outlines to increase transmittance, whereby the effect on the photometry result is reduced. The effect can be further reduced by shaping the icon of the intra-viewfinder liquid crystal display unit 41 differently from that of the extra-viewfinder liquid crystal display unit 43 to reduce the display area occupied by the icon. In other words, the display is changed to reduce the ratio of the display area of the display icon of the intra-viewfinder liquid crystal display unit 41 to the entire screen.

In FIG. 7C, all the nine icons are displayed in gray to increase the transmittance as compared to when the icons are displayed in black, without lowering visibility. The gray portions shall be transmissive. In such a manner, the transmittance of all the icons including the one(s) displayed in a region overlapping the photometry frame 419 in the intra-viewfinder liquid crystal display unit 41 can be increased to reduce the effect on the photometry result. Instead of the gray display, all the icons may be displayed in outline with high transmittance.

According to the exemplary embodiment described above, the effect of the display items displayed in a position overlapping the photometric range on the photometry result can be reduced without changing the layout of the display items of the intra-viewfinder liquid crystal display unit 41 from that of the extra-viewfinder liquid crystal display unit 43.

According to the WB displays of FIGS. 7A, 7B, and 7C, the effect on the photometry result can be reduced without changing the display positions of the respective display items from those of the extra-viewfinder liquid crystal display unit 43. In other words, the effect on the photometry result can be reduced without changing the display position of a display item or items having a large display area from the display position of a display item or items in the extra-viewfinder liquid crystal display unit 43.

Since the display items representing the same item are displayed in the same layout in the extra-viewfinder liquid crystal display unit 43 and the intra-viewfinder liquid crystal display unit 41, the user can intuitively make setting operations with less confusion.

With icons displayed in different color or shape, according to the present exemplary embodiment, one(s) having a large display area may be effectively displayed in a position away from the photometry frame 419 as described in the first exemplary embodiment.

The present exemplary embodiment has dealt with the icons of the WB mode. The present exemplary embodiment is not limited to the WB mode, and may be applied to any icon display that affects the photometry result (an icon display that is displayed overlapping the photometry frame 419).

Even if photometry (photometry operation) is performed on the same object in the same timing, photometric values to be used vary depending on the photometric method (between spot photometry and center average photometry). The effect of a display item also varies. While the present exemplary embodiment has dealt with the effect of the arrangement of display items on the photometry result, a display item displayed in a region overlapping the photometric range can affect the value measured by the AE sensor 15 regardless of what photometric method is selected. More specifically, even if the result of only a part of the range of the spot photometry is used as a photometric value, and a display item does not have any effect on the photometry result, the display item can affect a value related to image capturing that is calculated from the values obtained from the entire photometric range of the photometry frame 419.

The imaging apparatus 200 may be controlled by a single piece of hardware. A plurality of pieces of hardware may share processes to control the entire imaging apparatus 200.

The exemplary embodiments of the present invention have been described in detail. The present invention is not limited to such specific exemplary embodiments, and various modes not departing from the gist of the present invention are also covered by the present invention. The foregoing exemplary embodiments are merely exemplary embodiments of the present invention, and the exemplary embodiments may be combined as appropriate.

The foregoing exemplary embodiments have been described by using a case where an exemplary embodiment of the present invention is applied to an imaging apparatus as an example. An exemplary embodiment of the present invention is not limited to such an example, and may be applied to an imaging apparatus that provides a liquid crystal display on an optical path intended for photometry. More specifically, an exemplary embodiment of the present invention may be applied to a mobile phone terminal, a portable image viewer, a printer apparatus including a viewfinder, a digital photo frame, a music player, a game machine, an electronic book reader, etc.

An exemplary embodiment of the present invention may be implemented by executing the following processing. That is, the processing includes supplying software (program) for implementing the functions of the foregoing exemplary embodiments to a system or an apparatus via a network or various storage media, and reading and executing the program code by a computer (or central processing unit (CPU) or micro processing unit (MPU)) of the system or apparatus. In such a case, the program and the storage media storing the program constitute an exemplary embodiment of the present invention.

According to an exemplary embodiment of the present invention, an effect of a display overlapping a focusing screen on a photometry result can be reduced.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-156792, filed Jul. 31, 2014, which is hereby incorporated by reference herein in its entirety.

What is claimed is:

1. A photometric apparatus comprising a memory and at least one processor which control:
   a photometry unit configured to measure object light; and
   a first display unit arranged on an optical path of the object light to the photometry unit and configured to display a plurality of display items in a region including a region overlapping a photometric range where the photometry unit measures the object light, the plurality of display items including a first display item and a second display item having a display area smaller than a display area of the first display item,
   wherein the first display unit is configured to display the first display item in a display area outside a region of a display area corresponding to the photometric range, and display the second display item in a second display area inside the region of the display area corresponding to the photometric range, and
   wherein at least part of the second display item is displayed in a position that overlaps the photometric range.

2. The photometric apparatus according to claim 1, wherein each of the plurality of display items is a display item indicating a different state related to an identical setting item.

3. The photometric apparatus according to claim 1, further comprising a second display unit which is separate from the first display unit,
   wherein the plurality of display items is arranged in a first layout in the first display unit, and at least part of the plurality of display items is arranged in a second layout different from the first layout in the second display unit.

4. The photometric apparatus according to claim 3, further comprising:
   a focusing screen for an image of an object to be formed on; and
   a viewfinder optical system for observing an image formed on the focusing screen,
   wherein the first display unit is arranged near the focusing screen, and the second display unit is arranged in a position outside the viewfinder optical system.

5. The photometric apparatus according to claim 3, further comprising a selection unit configured to sequentially select the plurality of display items in the first display unit or the second display unit,
   wherein display items to be selected in adjoining order by the selection unit are displayed in adjoining positions.

6. The photometric apparatus according to claim 1, wherein the first display item is a display item having a maximum display area among the plurality of display items.

7. The photometric apparatus according to claim 1, wherein the second display item is a display item having a minimum display area among the plurality of display items.

8. The photometric apparatus according to claim 1, wherein the plurality of display items includes a display item indicating a setting related to white balance, and the first display item is a display item representing automatic white balance.

9. The photometric apparatus according to claim 2, wherein the first display unit is configured to display a plurality of display items indicating a state related to another item other than the setting item,
wherein the photometric apparatus further includes a first operation member configured to sequentially select the plurality of display items related to the setting item, and a second operation member configured to sequentially select the plurality of display items related to the another item, and
wherein display is performed, in the first display unit, such that a relationship between display positions of the plurality of display items related to the setting item and display positions of the plurality of display items related to the another item corresponds to a positional relationship between the first operation member and the second operation member.

10. The photometric apparatus according to claim 1, wherein an amount of light passed through the plurality of display items is smaller than an amount of light before passed through the plurality of display items.

11. An imaging apparatus using the photometric apparatus according to claim 1, the imaging apparatus including an imaging unit configured to capture an image of an object.

12. The photometric apparatus according to claim 1, wherein the photometric range is smaller than a region in which an optical image is visually recognizable via the first display unit.

13. A photometric apparatus comprising a memory and at least one processor which control:
a photometry unit configured to measure object light; and
a first display unit arranged on an optical path of the object light to the photometry unit and configured to display a plurality of display items in a region including a region overlapping a photometric range where the photometry unit measures the object light and a region not overlapping the photometric range, the plurality of display items including a first display item and display items having a display area smaller than a display area of the first display item,
wherein the first display unit is configured to display the first display item among the plurality of display items in a position farther from a center of the photometric range than at least a second display item among the display items having the display area smaller than the display area of the first display item.

14. The photometric apparatus according to claim 13, wherein each of the plurality of display items is a display item indicating a different state related to an identical setting item.

15. The photometric apparatus according to claim 13, further comprising a second display unit which is separate from the first display unit,
wherein the plurality of display items is arranged in a first layout in the first display unit, and at least part of the plurality of display items is arranged in a second layout different from the first layout in the second display unit.

16. The photometric apparatus according to claim 15, further comprising:
a focusing screen for an image of an object to be formed on; and
a viewfinder optical system for observing an image formed on the focusing screening,
wherein the first display unit is arranged near the focusing screen, and the second display unit is arranged in a position outside the viewfinder optical system.

17. A photometric apparatus comprising:
a photometry unit configured to measure object light;
a first display unit arranged on an optical path of the object light to the photometry unit; and
a second display unit arranged in a position off the optical path,
wherein the first display unit is configured to display a predetermined display item at least part of which is displayed in a position overlapping a photometric range where the photometry unit measures the object light among a plurality of display items displayed on the first display unit so that a ratio of a display area of the predetermined display item to an entire screen of the first display unit is lower than a ratio of a display area a corresponding predetermined display item displayed on the second display unit to an entire screen of the second display unit.

18. A photometric apparatus comprising a memory and at least one processor which control:
a photometry unit configured to measure object light; and
a display unit arranged on an optical path of the object light to the photometry unit,
wherein the display unit is configured to display a predetermined display item among a plurality of display items displayed on the display unit in a region of the display unit, at least part of the region overlapping a photometric range by the photometry unit, in a period when the photometry unit is not performing a photometry operation, and not to display the predetermined display item in a region overlapping the photometric range of the display unit in a period when the photometry unit is performing the photometry operation.

19. A method for controlling a photometric apparatus including a photometry unit configured to measure object light and a display unit arranged on an optical path of the object light to the photometry unit, the method comprising:
displaying a plurality of display items in a region of the display unit including a region overlapping a photometric range where the photometry unit measures the object light, the plurality of display items including a first display item and a second display item having a display area smaller than a display area of the first display item,
wherein displaying the plurality of display items includes displaying the first display item in a first display area outside a region of a display area corresponding to the photometric range, and displaying the second display item in a second display area inside the region of the display area corresponding to the photometric range, and
wherein at least part of the second display item is displayed in a position that overlaps the photometric range.

20. A method for controlling a photometric apparatus including a photometry unit configured to measure object light and a display unit arranged on an optical path of the object light to the photometry unit, the method comprising:

displaying a plurality of display items in a region of the display unit including a region overlapping a photometric range where the photometry unit measures the object light and a region not overlapping the photometric range, the plurality of display items including a first display item and display items having a display area smaller than a display area of the first display item, wherein displaying the plurality of display items includes displaying the first display item among the plurality of display items on the display unit in a position farther from a center of the photometric range than a position of at least a second display item among items having a display area smaller than a display area of the first display item.

21. A non-transitory computer-readable storage medium storing a program for performing the method according to claim 19.

22. A non-transitory computer-readable storage medium storing a program for performing the method according to claim 20.

* * * * *